No. 662,002. Patented Nov. 20, 1900.
E. H. KUHL.
PLOW ATTACHMENT.
(Application filed July 24, 1900.)

(No Model.)

Inventor
Edward H. Kuhl

Witnesses

By                Attorneys

THE NORRIS PETERS CO., PHOTO-LITHO., WASHINGTON, D. C.

UNITED STATES PATENT OFFICE.

EDWARD H. KUHL, OF BEARDSTOWN, ILLINOIS.

PLOW ATTACHMENT.

SPECIFICATION forming part of Letters Patent No. 662,002, dated November 20, 1900.

Application filed July 24, 1900. Serial No. 24,688. (No model.)

*To all whom it may concern:*

Be it known that I, EDWARD H. KUHL, a citizen of the United States, residing at Beardstown, in the county of Cass and State of Illinois, have invented certain new and useful Improvements in Plow Attachments; and I do hereby declare the following to be a full, clear, and exact description of the invention, such as will enable others skilled in the art to which it appertains to make and use the same.

This invention relates to means to be applied to turning-plows to facilitate their operation, especially when working in grass-grown soil, since the sod is cut in advance of the plow and landward thereof to a distance of a few inches, thereby enabling the slice to break up and turn more easily, and grass and the like are drawn into the furrow to be covered.

The attachment consists, essentially, of a cutter, means applied to the cutter for vertically adjustably connecting it with the plow-beam, a supplemental cutter projecting from the landside of the main cutter and located at the front end thereof, and a drag at the rear end of the main cutter and extending from the furrow side thereof to gather grass, weeds, and the like and direct them into the furrow to be covered by the slice.

For a full description of the invention and the merits thereof, and also to acquire a knowledge of the details of construction of the means for effecting the result, reference is to be had to the following description and drawings hereto attached.

While the essential and characteristic features of the invention are necessarily susceptible of modification, still the preferred embodiment of the invention is illustrated in the accompanying drawings, in which—

Figure 1:
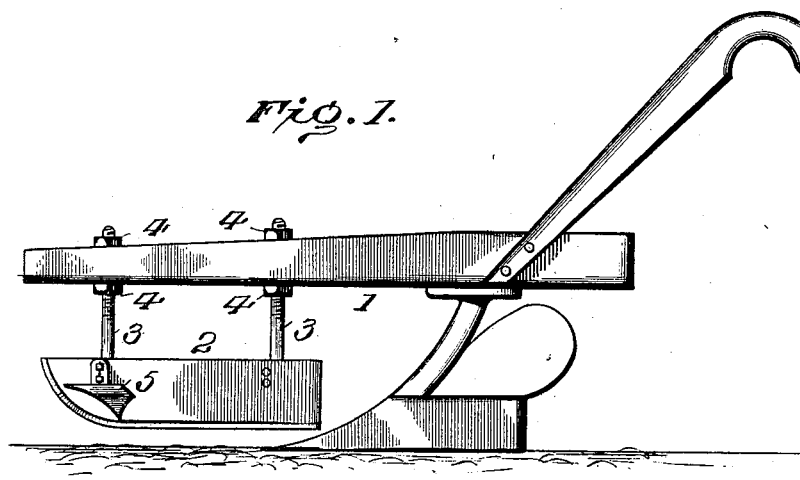
Figure 2:
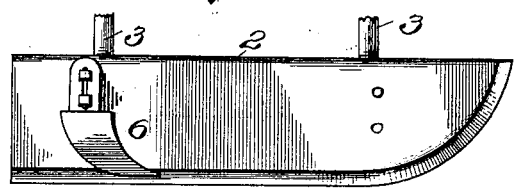
Figure 3:
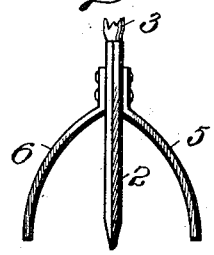
Figure 4:

Figure 1 is a side view of a plow, showing the attachment in position. Fig. 2 is a detail view of the attachment as seen from the reverse side of Fig. 1. Fig. 3 is a front end view. Fig. 4 is a top plan view.

Corresponding and like parts are referred to in the following description and indicated in all the views of the drawings by the same reference characters.

The plow shown is of ordinary construction and has been selected to illustrate the application of the invention, which consists of a cutter 2, attached to the beam 1 in such a manner as to be adjusted vertically to regulate the depth of cut. The cutter 2 is oblong, and its front end is made rounding and sharpened. The lower edge is straight and sharpened. Rods 3 are attached to opposite ends of the cutter and project vertically in parallel relation and have their upper ends threaded and adapted to pass through vertical openings in the beam 1. A pair of nuts 4 is applied to each rod 3, and the nuts of each pair bind against opposite sides of the beam 1 and secure the cutter 2 in the desired position.

A supplemental cutter 5 is secured to the front end of the main cutter and projects laterally therefrom on the landside to cut grass, weeds, and the like a few inches from the landside of the plow, so as to facilitate the breaking up of the slice when turning. The edge of the cutter 5 curves laterally, downwardly, and rearwardly.

A drag 6 is bolted or otherwise attached to the furrow side of the cutter 2 near its rear end and curves laterally, downwardly, and forwardly and is designed to catch grass, weeds, and the like and direct them into the furrow, so as to be plowed under.

The attachment is adapted to be fitted to any style of plow and is located in front of the share a few inches and will operate in any soil, its advantages being most apparent when plowing root-covered ground.

Having thus described the invention, what is claimed as new is—

1. A plow attachment comprising a main cutter, and a supplemental cutter attached to the main cutter and curving laterally and downwardly therefrom to cut the soil a distance from and parallel with the main cutter, substantially as described.

2. A plow attachment comprising a main cutter, and a supplemental cutter attached to the main cutter and curving laterally and downwardly therefrom and having its front edge rearwardly curved and adapted to cut the soil a distance from and parallel with the main cutter, substantially as described.

3. A plow attachment comprising a main cutter, a supplemental cutter projecting from one side of the main cutter, and a drag projecting from the opposite side of the said main cutter, substantially as described.

4. A plow attachment comprising a main cutter, a supplemental cutter at the front end of the main cutter and projecting from a side thereof, and a drag at the rear end of the main cutter and projecting from the opposite side thereof, substantially as specified.

5. A plow attachment comprising a main cutter, rods projected vertically from the cutter to pass through openings in the beam of the implement, a pair of nuts fitted to the threaded portions of the rods to hold the cutter in an adjusted position, a supplemental cutter projected from the front end of the main cutter and curving laterally, rearwardly and downwardly, and a drag extended laterally, forwardly and downwardly from the rear end of the main cutter, substantially as set forth.

In testimony whereof I affix my signature in presence of two witnesses.

EDWARD H. KUHL.

Witnesses:
H. J. MOHLMANN,
ED. FRENCH.